INVENTORS
P. L. DATT
W. J. WARREN
R. B. WILLOUGHBY
BY J. H. McCarthy
THEIR AGENT April 18, 1961 P. L. DATT ET AL 2,980,848
WELD SEAM TESTING APPARATUS
Filed Dec. 24, 1956 3 Sheets-Sheet 2
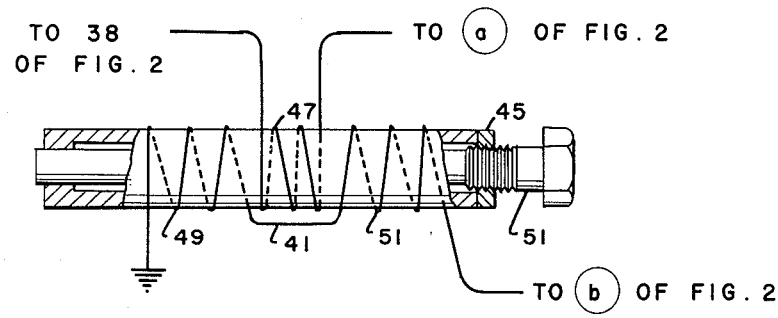
FIG. 5
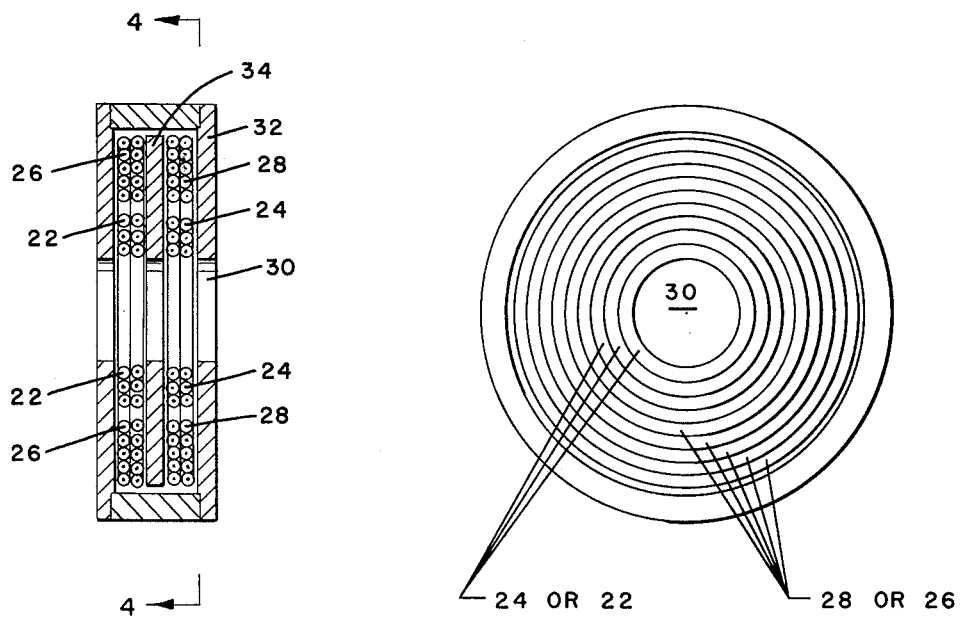
FIG. 3
FIG. 4
INVENTORS
P.L. DATT
W.J. WARREN
R.B. WILLOUGHBY
BY J.H. McCarthy
THEIR AGENT April 18, 1961  P. L. DATT ET AL  2,980,848
WELD SEAM TESTING APPARATUS
Filed Dec. 24, 1956  3 Sheets-Sheet 3
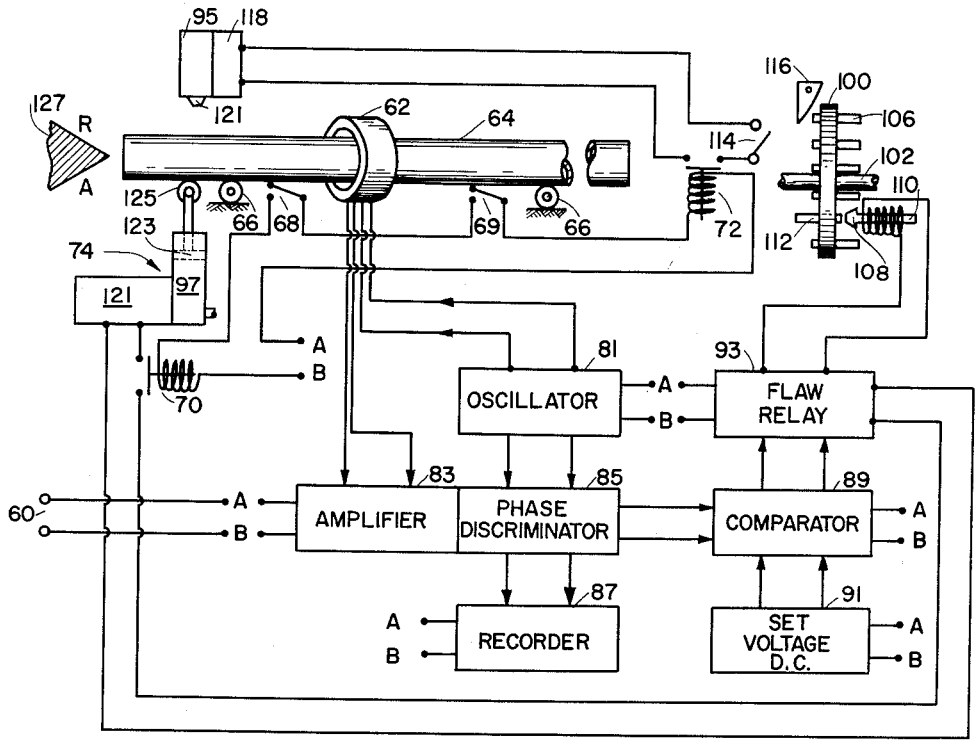
FIG. 6
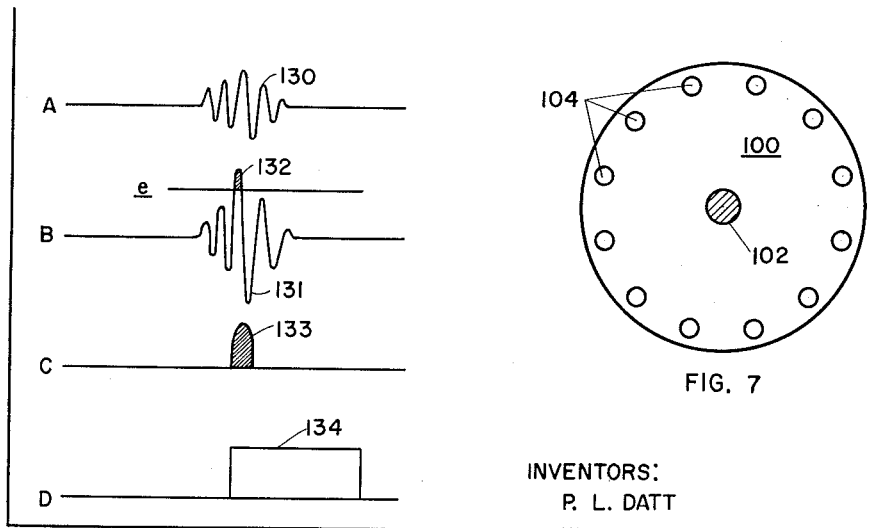
FIG. 8
FIG. 7
INVENTORS:
P. L. DATT
W. J. WARREN
R. B. WILLOUGHBY
BY: J. H. McCarthy
THEIR AGENT

United States Patent Office 2,980,848
Patented Apr. 18, 1961

2,980,848
WELD SEAM TESTING APPARATUS

Paul L. Datt, Walnut Creek, William J. Warren, El Cerrito, and Richard B. Willoughby, Walnut Creek, Calif., assignors to Shell Oil Company, a corporation of Delaware Filed Dec. 24, 1956, Ser. No. 630,188

6 Claims. (Cl. 324—34)

This invention relates to an apparatus for magnetically detecting and recording flaws and variations in the wall thickness of metallic members, particularly elongated metallic tubular elements, such for example as lengths of heat exchanger tubing.

In addition to testing extruded tubing, the present apparatus pertains particularly to the non-destructive testing of the longitudinal seam of welded tubing made of non-magnetic materials.

At present there are at least three methods of testing the seam of welded tubing as it is being manufactured, and each of the various test methods has one or more drawbacks. The visual test method is often uncertain and cannot be employed to detect flaws beneath the surface of the tubing. The hydrostatic test method is both inconvenient and time-consuming in that the tubing must be cut into short sections, say twenty feet, in order that one end may be closed while hydrostatic pressure is applied at the other end. Probably the most convenient test method employed to date is the X-ray test method but this, unfortunately, is very expensive.

It is therefore an object of the present invention to provide a magnetic testing system adapted for non-destructive testing of the longitudinal seam of welded tubing of non-magnetic materials.

A further object of this invention is to provide a magnetic testing system capable of furnishing a complete and accurate record of the relative thickness of a member under test throughout its length in such a manner that any thickness variation due to structural characteristics of said member, or due to a weld in said member, will appear on the record as definite reference points for a ready determination of the location of said undesirable variations or flaws.

Another object of this invention is to provide a sensing head for a magnetic testing system through which continuous lengths of extruded or welded tubing may pass and by which flaws in said tubing or said weld therein may be located.

Still another object of this invention is to provide a magnetic testing system by which continuous lengths of tubing may be tested, said system being provided with means for positively marking the portions of tubing having flaws therein.

A further object of this invention is to provide a magnetic testing system adapted to locate flaws in welded tubing of non-magnetic material, said system being adapted to reject sections of tubing having flaws therein.

These and other objects of this invention will be understood from the following description taken with reference to the attached drawing wherein:

Figure 3 is a diagrammatic view taken in cross-section of the annular-shaped sensing head of the present test system.

Figure 4 is a view taken along line 4—4 of Figure 3.

Figure 5 is a diagrammatic view of one coil-balancing means adapted to be used with the present system.

Figure 6 is a diagrammatic view of the general arrangement of parts and electrical circuits of the present testing system, showing a sensing-head having passing therethrough a tubular member such as may be tested according to the present invention.

Figure 7 is an end view of disc 100 shown in Figure 6.

Figure 8 illustrates four curves which diagrammatically represent various types of signals originating in or exchanged between the different units or circuits of the present system.

Figure 1:
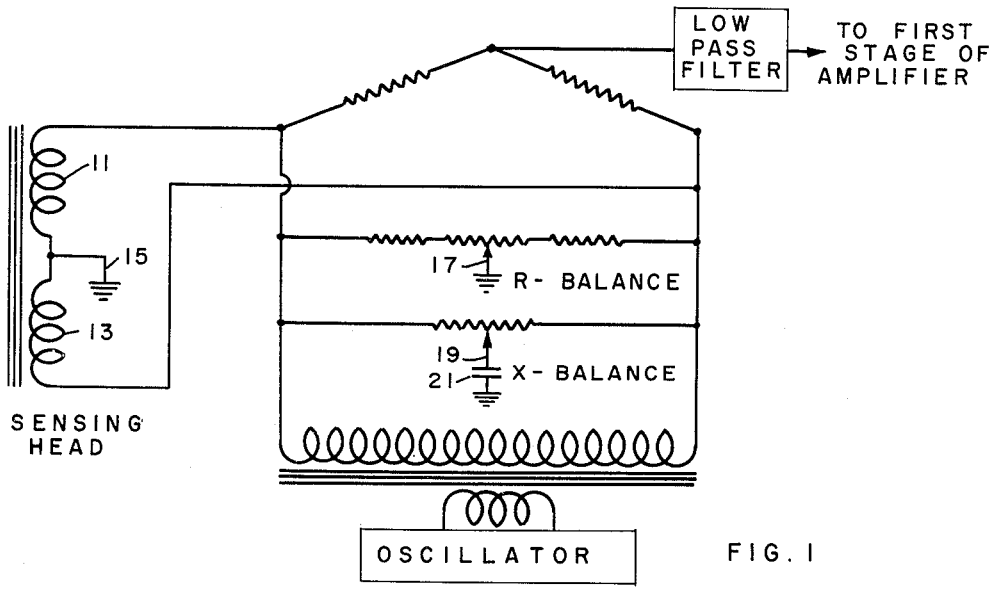
Figures 1 and 2 are schematic views of the general arrangement of parts and electrical circuits of two modifications of the present magnetic testing system.
Figure 2:
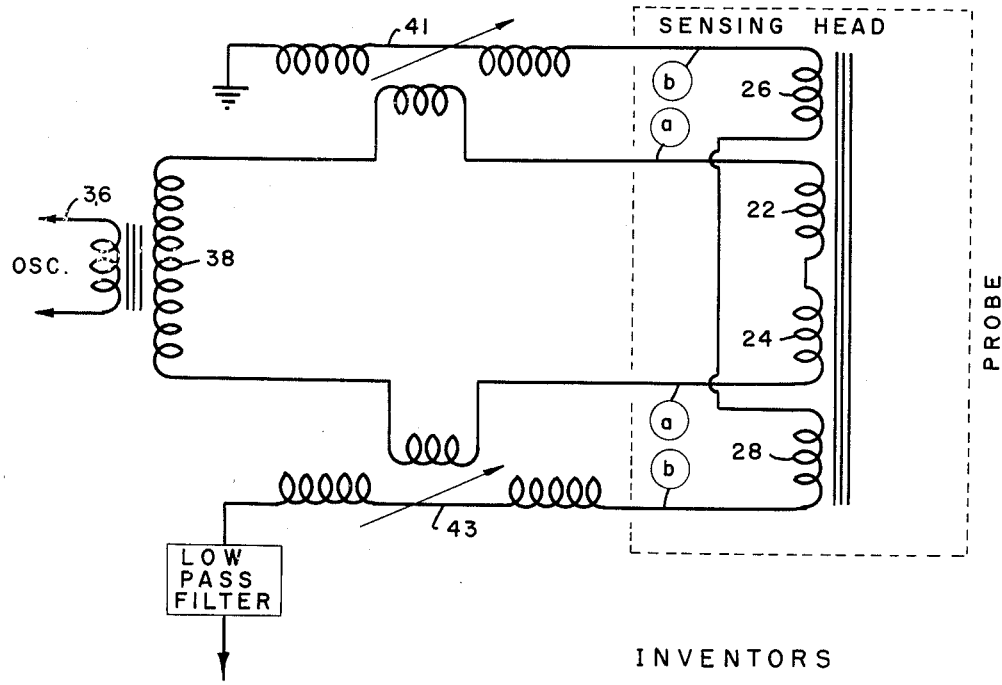

Wiring connections of sensing heads suitable for use with the system are shown in Figures 1 and 2. The head shown in Figure 1 has only two coils 11 and 13, both primaries, having a ground 15 therebetween. Means for adjusting resistance are shown at 17, and means for adjusting inductive reactance are shown at 19, the latter comprising a capacitor 21 to ground.

The head shown in Figure 2 has two primaries 22 and 24, physically positioned between, or surrounded by, the secondaries 26 and 28. The actual construction of the sensing head of Figure 2 is shown in greater detail in Figures 3 and 4, showing two views, at right angles to each other, of a cross-section of said head.

The head has the general shape of a flat annulus, being provided with a central axial opening 30, through which any elongated element such as a tubular member under test is passed. The head has a cover 32, and a central partition 34, made of a material such as "Mu Metal" which is a steel alloy having high electrical permeability, which is made by Allegheny-Ludlum Corp., separating coils 22 and 26 from coils 24 and 28. The primaries 22 and 24 are energized from an oscillator by means of a transformer having primary and secondary windings 36 and 38 (Figure 2) in series with coils 22 and 24.

Magnetic coupling between coils 22 and 26 (or 24 and 28), is balanced out by means of the balancing coils 41 and 43 of Figure 2, as shown in greater detail in Figure 5.

The balancing coil 41, shown in Figure 5, comprises a non-magnetic tubular form or element 45 on which there is wound a primary 47 electrically connected as shown in the drawing. The secondary which is also wound on the core 45 comprises two coils 49 and 51, located to either side of the primary 47 and connected as shown. The magnetic coupling between the primary and secondary coils can be adjusted or varied by advancing or withdrawing an armature member 53, by any suitable means as by a micro-screw 53a.

The structure of the balancing coil 43 (Figure 2) may be identical with that of coil 41, except for the material of the armature 53. For example if one of the armatures for coils 41 and 43 is made of a magnetic material, and the other of a non-magnetic material such as brass, they can be effectively used to balance out resistance and inductive reactance effects, respectively, caused by the mutual inductance between the coils 22 and 26 (or 24 and 28).

Figure 6 shows the general arrangement of the units forming the present system. The system is energized from any desired source of electric power 60, to which each of the units of the system is connected by means of the several sets of terminals diagrammatically indicated at A and B, the complete circuits for providing operating currents not being shown to simplify the drawing. The sensing head 62, which is that of Figures 1–4, is positioned to receive within its central opening a tubular or other elongated metallic member 64, which is advanced therethrough by means of rollers 66 while being magnetically tested by the head 62. Positioned to either side of the head 62 are switches 68 and 69. These switches are biased to remain normally open, and are closed in succession by the test member 64 as it is advanced through the annular head 62. The switches 68 and 69 are connected in series across the power supply terminals A and B and form part of a branch circuit comprising relay switches 70 and 72. When the current in this branch circuit is interrupted due to the opening of either switch 68 or switch 69, or both, the relay switches 70 and 72 open likewise, thus deenergizing the sorting unit 74 and the marking unit 95 to be described hereinbelow. It will be seen that units 74 and 95 are thus rendered inoperative whenever there is no test member within the sensing head 62, or only one end of such member is inserted therein, that is, when one or both of the switches 68 and 69 are open. This is an important feature of the present system, because the ends of any test member constitute non-symmetric or irregular arrangements of metallic matter, and test members cannot be correctly marked or sorted in accordance with magnetic indications obtained at said ends.

An energizing alternating current of a frequency such as from 500 cycles to 25 kilocycles is supplied to the testing head 62 by an oscillator 81, and the signals from the testing head are received by an amplifier 83. A part of the amplifier circuit comprises a phase discriminator circuit 85, which is likewise fed by the oscillator 81. The discriminator circuit operates as a gate: if the signal pulse received from the head 62 is in phase with the current received from the oscillator 81, the signal pulse is allowed to pass to a recorder 87 and to a comparator unit 89. In the comparator unit 89, the signal pulse is compared as to amplitude with that of a predetermined or set D.C. voltage received from a source 91. If the signal pulse amplitude exceeds that of the preset voltage, this excess voltage is applied as signal to a flaw relay circuit 93, where the signal is stretched with regard to its time of duration, so as to permit said signal to operate a relay (signals actually received from this head are normally of such short duration that they are not operative for energizing relays).

Upon energization of the flaw relay circuit 93, the latter actuates a marking unit 95 and the sorting or selecting unit 97 in the following manner.

A disc 100 is arranged for rotation about a shaft or axis 102 by any desired prime mover means, not shown. The disc 100 has near its circumference a plurality of holes 104, inserted in which are a plurality of pegs 106. The armature 108 of a relay solenoid 110 is positioned in register with the circle along which the pegs 106 are arranged. Upon energization of the solenoid, the armature 108 is propelled toward the disc 100, and depresses one of the pegs, for example, peg 112. Upon continued rotation of the disc 100, peg 112 moves past a switch 114 and momentarily closes this switch, thus energizing the control mechanism 118 of the marking unit 95 and causing said unit to project a marking substance, such as a drop of paint, on the test member 64. The speed of rotation of disc 100 is synchronized with the speed of motion of the test member 64 through the head 62 in such manner that the flaw which produces a signal adapted to energize the flaw relay unit 93 has exactly the time to move adjacent the marking nozzle 121 at the time when the peg 112 arrives at switch 114 and closes this switch. The peg 112 is then returned to its original position by a cam 116 during the continued rotation of disc 100.

The energization of the flaw relay circuit 93 causes likewise an operating signal to be transmitted to the control circuit 121 of a selecting or sorting unit 74. The latter may comprise a cylinder 97 to which, upon the reception of a signal by the control circuit 121, a hydraulic fluid is admitted from any desired source, not shown, to move a piston 123 provided with a piston rod carrying a guiding wheel 125 serving to direct the test member either to the "Accept" or the "Reject" side of a sorting wedge 127. It is understood that the sorting system has been described hereinabove only by way of mere illustration, and can be replaced by any equivalent automatic sorting system desired without departing from the spirit of the present invention.

The operation of the present system can further be made clear from a consideration of the various types of signals originating in or exchanged between the different units or circuits of the system, as diagrammatically illustrated in Figure 8.

The sensing head 62 being adjusted to a state of balance at the beginning of a test, no current or signal is delivered to the amplifier until a portion of the pipe having a flaw is made to pass through the head, at which time the sensing head becomes magnetically unbalanced and produces a "defect" signal such as shown at 130 on line A of Figure 8. This defect signal consists of a group of oscillations having a frequency equal to that of the oscillator 81. This signal is amplified at 83 to an amplitude shown at 131 on line B, and, if the phase of the signal is the same as that of the oscillator, the signal is passed by the phase discriminator 85 to the comparator 89, where the signal is compared for amplitude with a predetermined set D.C. voltage supplied by the unit 91 and shown at $e$ on line B of Figure 8.

The desired defect signal from the sensing head is shifted in phase in the amplifier so that it will be in phase with the oscillator signal applied to the discriminator. This phase shift can be accomplished in other parts of the circuit. For example, the oscillator signal to either the sensing head or the discriminator could be shifted in phase.

The reason for using phase discrimination rather than amplitude detection is because defect signals can be detected in the presence of unwanted signals from such things as stress in the metal, or the "drag cup effect," provided they are separated in phase. Also, with phase discrimination it is possible to detect signals caused by a single type of defect from signals caused by all other types of defects. Each type of defect has a characteristic phase angle in any particular given metal.

If the amplitude of the signal 131, which is determined by the magnitude of the flaw to which it corresponds, exceeds a predetermined permissible value, that portion of the signal which is in excess of the preset voltage $e$, as shown at 132, operates to trigger a special circuit in the comparator, which amplifies said excess voltage to a value shown at 133 on line C, and stretches the signal 133 in time to a shape shown at 134 on line D, since the duration of signal 133 is normally much too short to operate relay circuits such as shown at 93, 110, 121, etc.

We claim as our invention:

1. A magnetic testing system comprising a sensing head, means for supporting a test piece adjacent said head, means for moving said head and said test piece relative to each other, a source of oscillating voltage coupled to said head, said sensing head being adapted to produce a first signal voltage when being in register with an anomaly in said test piece, said first signal voltage being coupled to a phase discriminating means for comparing the phase of said first signal and said oscillating voltages, said phase discriminating means generating a second signal when said first signal and said oscillating voltages are in phase, a source of set voltage, means comprising a comparator circuit connected to the outputs of said phase discriminating means and of said set voltage source for comparing the amplitude of said second signal and said set voltage, circuit means connected to the output of said comparator circuit for amplifying any excess of said second signal over said set voltage to a pulse of increased amplitude and time duration, and means energized by said pulse to store mechanically a signal, said stored signal being used to perform work on said test piece in synchronism with the relative motion of the sensing head and the test piece.

2. A magnetic testing system comprising an annular sensing head, means for supporting a test piece adjacent said head, means for moving said test piece through said sensing head, a source of oscillating voltage coupled to said head, said sensing head being adapted to produce a first signal voltage when being in register with an anomaly in said test piece, said first signal voltage being coupled to a phase discriminating means for comparing the phase of said first signal and said oscillating voltages, said phase discriminating means generating a second signal when said first signal and said oscillating voltages are in phase, a source of set voltage, means comprising a comparator circuit connected to the outputs of said phase discriminating means and of said set voltage source for comparing the amplitude of said second signal and said set voltage, circuit means connected to the output of said comparator circuit for amplifying any excess of said second signal over said set voltage to a pulse of increased amplitude and time duration, and means energized by said pulse to store mechanically a signal, said signal being used to operate a relay to mark said test piece at location of said anomaly.

3. A magnetic testing system comprising an annular sensing head, means for supporting a portion of a test piece within said head, means for moving said test piece through said sensing head, a source of oscillating voltage coupled to said head, said sensing head being adapted to produce a first signal voltage when being in register with an anomaly in said test piece, said first signal voltage being coupled to a phase discriminating means for comparing the phase of said first signal and said oscillating voltages, said phase discriminating means generating a second signal when said first signal and said oscillating voltages are in phase, a source of set voltage, means comprising a comparator circuit connected to the outputs of said phase discriminating means and of said voltage source for comparing the amplitude of said second signal and said set voltage, circuit means connected to the output of said comparator circuit for amplifying any excess of said second signal over said set voltage to a pulse of increased amplitude and time duration, marking means positioned adjacent said test piece for marking said test piece at the point of the anomaly therein, and means energized by said increased pulse to actuate said marking means, said means including mechanical storage means being synchronized for operation with the relative motion of the sensing head and the test piece.

4. A magnetic testing system comprising an annular sensing head, means for supporting a portion of a test piece within said head, means for moving said test piece through said sensing head, a source of oscillating voltage coupled to said head, said sensing head being adapted to produce a first signal voltage when being in register with an anomaly in said test piece, said first signal voltage being coupled to a phase discriminating means for comparing the phase of said first signal and said oscillating voltages, said phase discriminating means generating a second signal when said first signal and said oscillating voltages are in phase, a source of set voltage, means comprising a comparator circuit connected to the outputs of said phase discriminating means and of said voltage source for comparing the amplitude of said second signal and said set voltage, circuit means connected to the output of said comparator circuit for amplifying any excess of said second signal over said set voltage to a pulse of increased amplitude and time duration, mechanical storage means energized by said increased pulse to store a signal, said mechanical storage means operating in synchronism with said means for moving said test piece through said sensing head; and said stored signal actuating an electrical circuit to mark said test piece at the location of said anomaly.

5. A magnetic testing system comprising: a sensing head; means for supporting a test piece adjacent said head; means for moving said head and said test piece relative to each other; said sensing head being adapted to produce a signal voltage when in register with an anomaly in said test piece; circuit means responsive to said signal voltage for energizing a mechanical storage system to store a signal, said mechanical storage system operating in synchronism with the means for moving said head and the test piece relative to each other, said stored signal actuating an electrical system to mark said test piece at the location of said anomaly and switch means disposed on opposite sides of said sensing head to inactivate the testing system within a predetermined distance of each end of the test piece.

6. A magnetic testing system comprising: a sensing head; means for supporting a test piece adjacent said head; means for moving said head and said test piece relative to each other; a source of oscillating voltage coupled to said sensing head; said sensing head being disposed to produce a first signal voltage when in register with an anomaly in said test piece; circuit means coupled to said sensing head and the source of oscillating voltage, said circuit means including both a phase discriminating stage for supplying a second signal when said first signal and said oscillating voltages are in phase and a comparing stage for comparing the amplitude of the second signal and amplitude of a set signal and supplying any excess of the second signal over the set signal as an error signal; additional circuit means for amplifying and increasing the duration of the error signal from the comparing stage of said circuit means and means operated in synchronism with relative motion of the sensing head and test piece and energized by the signal from the amplifier for performing work on the test piece.

References Cited in the file of this patent

UNITED STATES PATENTS

| | | |
|---|---|---|
| 2,102,452 | Zuschlag | Dec. 14, 1937 |
| 2,133,687 | Drake | Oct. 18, 1938 |
| 2,228,294 | Wurzbach | Jan. 14, 1941 |
| 2,415,789 | Farrow | Feb. 11, 1947 |
| 2,437,455 | Berman | Mar. 9, 1948 |
| 2,489,920 | Michel | Nov. 29, 1949 |
| 2,580,670 | Gilbert | Jan. 1, 1952 |
| 2,587,686 | Berry | Mar. 4, 1952 |
| 2,806,992 | Foerster | Sept. 17, 1957 |
| 2,842,851 | Dexter | July 15, 1958 |